(12) United States Patent
Chakravarti et al.

(10) Patent No.: US 7,655,737 B2
(45) Date of Patent: Feb. 2, 2010

(54) POLYCARBONATE-POLYESTER BLENDS, METHODS OF MANUFACTURE, AND METHODS OF USE

(75) Inventors: Shreyas Chakravarti, Evansville, IN (US); Gabrie Hoogland, Bergen op Zoom (NL); Vishvajit Chandrakant Juikar, Bangalore (IN); Ganesh Kannan, Evansville, IN (US); Edward Kung, Bergen op Zoom (NL); Nina P. Vaze, Stabroek (BE); Karin I. van de Wetering, Bergen op Zoom (NL)

(73) Assignee: Sabic Innovative Plastics IP B.V. (NL)

( * ) Notice: Subject to any disclaimer, the term of this patent is extended or adjusted under 35 U.S.C. 154(b) by 615 days.

(21) Appl. No.: 11/560,642

(22) Filed: Nov. 16, 2006

(65) Prior Publication Data

US 2008/0119617 A1    May 22, 2008

(51) Int. Cl.
*C08F 20/00* (2006.01)
(52) U.S. Cl. ...................................... 525/439
(58) Field of Classification Search ............... 525/439
See application file for complete search history.

(56) References Cited

U.S. PATENT DOCUMENTS

| | | | |
|---|---|---|---|
| 3,313,777 | A | 4/1967 | Elam et al. |
| 3,317,466 | A | 5/1967 | Caldwell et al. |
| 3,386,935 | A | 6/1968 | Jackson, Jr. et al. |
| 3,625,877 | A | 12/1971 | Jackson, Jr. et al. |
| 4,169,868 | A | 10/1979 | Schreckenberg et al. |
| 4,216,298 | A | 8/1980 | Schreckenberg et al. |
| 4,250,279 | A | 2/1981 | Robeson et al. |
| 4,259,458 | A | 3/1981 | Robeson |
| 4,297,455 | A | 10/1981 | Lindner et al. |
| 4,417,018 | A | 11/1983 | Ogawa et al. |
| 4,430,473 | A | 2/1984 | Brode et al. |
| 4,433,119 | A | 2/1984 | Brode et al. |
| 4,513,037 | A | 4/1985 | Collins |
| 4,598,129 | A | 7/1986 | Borman et al. |
| 4,643,937 | A | 2/1987 | Dickinson et al. |
| 4,657,977 | A | 4/1987 | Peters |
| 4,741,864 | A | 5/1988 | Avakian et al. |
| 4,855,377 | A | 8/1989 | Yokota et al. |
| 4,874,783 | A | 10/1989 | Nelson et al. |
| 4,900,612 | A | 2/1990 | Sato et al. |
| 4,994,526 | A | 2/1991 | Peters |
| 5,037,935 | A | 8/1991 | Gulotty et al. |
| 5,084,527 | A | 1/1992 | Yamamoto et al. |
| 5,166,289 | A | 11/1992 | Yezrielev et al. |
| 5,210,155 | A | 5/1993 | Yezrielev et al. |
| 5,250,349 | A | 10/1993 | Nakagawa et al. |
| 5,334,647 | A | 8/1994 | Sperk, Jr. et al. |
| 5,346,767 | A | 9/1994 | Tilley et al. |
| 5,416,148 | A | 5/1995 | Farah et al. |
| 5,712,333 | A | 1/1998 | Hofmeister et al. |
| 5,731,389 | A | 3/1998 | Bailly et al. |
| 5,847,011 | A | 12/1998 | Terado et al. |
| 6,015,625 | A | 1/2000 | Morizono et al. |
| 6,066,694 | A | * 5/2000 | Chisholm et al. .............. 525/67 |
| 6,103,837 | A | 8/2000 | Hiiro et al. |
| 6,140,422 | A | 10/2000 | Khanarian et al. |
| 6,143,839 | A | * 11/2000 | Webb et al. .................. 525/439 |
| 6,174,943 | B1 | 1/2001 | Matsumoto et al. |
| 6,221,556 | B1 | 4/2001 | Gallucci et al. |

(Continued)

FOREIGN PATENT DOCUMENTS

EP    0 605 194 A2    7/1994

(Continued)

OTHER PUBLICATIONS

International Searching Authority, International Search Report PCT/US2007/074797, Mailing date: Dec. 10, 2007; 6 pages.

(Continued)

*Primary Examiner*—Bernard Lipman
(74) *Attorney, Agent, or Firm*—Cantor Colburn LLP

(57) ABSTRACT

A composition comprising a blend of: from 1 to 99 weight percent of a polycarbonate comprising from 10 to 90 mole percent of one or more arylate carbonate units of the formula

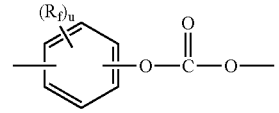

wherein each $R_f$ is independently a $C_{1-12}$ hydrocarbon, halogen, or halogen-substituted $C_{1-12}$ hydrocarbon, and u is 0 to 4; and from 10 to 90 mole percent of different carbonate units of the formula

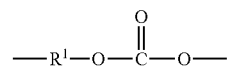

wherein at least 60% of the $R^1$ groups are $C_{6-30}$ aromatic groups, and from 1 to 99 weight percent of a polyester comprising units of the formula

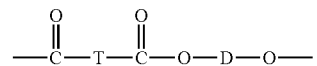

wherein T is a residue derived from a $C_5$-$C_7$ cycloaliphatic or $C_7$-$C_{12}$ aromatic dicarboxylic acid or a chemical equivalent thereof, and D is a residue derived from a $C_6$-$C_{12}$ aromatic or $C_2$-$C_{12}$ aliphatic diol or a chemical equivalent thereof, provided that at least 50 mole percent of D is derived from 1,4-cyclohexanedimethanol or a chemical equivalent thereof; and wherein the weight percent of the polycarbonate and the polyester are each based on the total weight of the polycarbonate and the polyester.

32 Claims, No Drawings

U.S. PATENT DOCUMENTS

| | | | |
|---|---|---|---|
| 6,323,291 B1 * | 11/2001 | Mason et al. | 525/439 |
| 6,329,451 B2 | 12/2001 | Matsumoto et al. | |
| 6,361,724 B1 | 3/2002 | Maeda et al. | |
| 6,362,269 B1 | 3/2002 | Ishihata et al. | |
| 6,458,913 B1 | 10/2002 | Honigfort et al. | |
| 6,635,698 B2 | 10/2003 | Goossens et al. | |
| 6,723,768 B2 * | 4/2004 | Adams et al. | 524/108 |
| 6,727,294 B2 * | 4/2004 | Kanayama et al. | 523/136 |
| 6,762,250 B2 | 7/2004 | Kanayama et al. | |
| 6,833,425 B1 | 12/2004 | Hecht et al. | |
| 6,887,573 B2 | 5/2005 | Vollenberg et al. | |
| 6,896,966 B2 | 5/2005 | Crawford et al. | |
| 6,989,190 B2 * | 1/2006 | Gaggar et al. | 428/220 |
| 6,996,918 B2 | 2/2006 | Bsirske et al. | |
| 7,022,764 B2 | 4/2006 | Murray | |
| 7,067,186 B2 | 6/2006 | Oguro et al. | |
| 7,098,263 B2 | 8/2006 | Mitsunaga et al. | |
| 7,118,799 B2 | 10/2006 | Crawford et al. | |
| 7,226,985 B2 * | 6/2007 | Hale et al. | 528/272 |
| 7,425,590 B2 * | 9/2008 | Hale | 524/102 |
| 2002/0165327 A1 | 11/2002 | Hoogland et al. | |
| 2003/0027941 A1 | 2/2003 | Sawaki et al. | |
| 2003/0125504 A1 | 7/2003 | Miyoshi et al. | |
| 2004/0096683 A1 | 5/2004 | Ikeda et al. | |
| 2004/0127653 A1 | 7/2004 | Ellington et al. | |
| 2004/0147655 A1 | 7/2004 | Sawaki et al. | |
| 2004/0220333 A1 | 11/2004 | Tadros et al. | |
| 2005/0004292 A1 | 1/2005 | Harashina et al. | |
| 2005/0049360 A1 | 3/2005 | Okamoto | |
| 2005/0095433 A1 | 5/2005 | Bogerd et al. | |
| 2005/0113533 A1 | 5/2005 | Shaikh et al. | |
| 2005/0113534 A1 | 5/2005 | Agarwal et al. | |
| 2005/0137358 A1 | 6/2005 | Zhang et al. | |
| 2005/0137360 A1 | 6/2005 | Shaikh et al. | |
| 2005/0147778 A1 | 7/2005 | Tai et al. | |
| 2005/0165176 A1 | 7/2005 | Matsushima et al. | |
| 2005/0171252 A1 | 8/2005 | Schambony et al. | |
| 2005/0215677 A1 | 9/2005 | Gaggar et al. | |
| 2005/0228122 A1 | 10/2005 | Kannan et al. | |
| 2005/0261460 A1 | 11/2005 | Cella et al. | |
| 2005/0288405 A1 | 12/2005 | Wit et al. | |
| 2006/0004151 A1 | 1/2006 | Shaikh et al. | |
| 2006/0074202 A1 | 4/2006 | Juikar et al. | |
| 2006/0078802 A1 | 4/2006 | Chan et al. | |
| 2006/0079635 A1 | 4/2006 | Pohl et al. | |
| 2006/0100393 A1 | 5/2006 | Hale et al. | |
| 2006/0135690 A1 | 6/2006 | Juikar et al. | |
| 2006/0142455 A1 | 6/2006 | Agarwal et al. | |

FOREIGN PATENT DOCUMENTS

| | | |
|---|---|---|
| EP | 0 736 558 A2 | 10/1996 |
| EP | 0 774 491 A2 | 5/1997 |
| WO | 9304128 A1 | 3/1993 |
| WO | 99/63002 A1 | 12/1999 |
| WO | 03/004561 A2 | 1/2003 |

OTHER PUBLICATIONS

International Searching Authority, Written Opinion of the International Searching Authority PCT/US2007/074797, Mailing date: Dec. 10, 2007, 8 pages.

* cited by examiner

POLYCARBONATE-POLYESTER BLENDS, METHODS OF MANUFACTURE, AND METHODS OF USE

BACKGROUND OF THE INVENTION

This disclosure relates to blends of polycarbonates and polyesters, and in particular to transparent blends of these polymers, their methods of manufacture, and uses thereof.

Blends of polycarbonate and polyesters have a number of advantageous properties, including toughness and chemical resistance. Such blends can also have high optical transparency. These properties make polycarbonate-polyester blends particularly useful in applications as diverse as medical containers and hot tub covers. However, these and other applications require that the blends retain their advantageous properties after aging particularly after exposure to heat. In other applications, such as automotive parts, it is desirable to use blends that have improved toughness at low temperatures.

There accordingly remains a need in the art for polycarbonate-polyester blends having improved toughness, particularly impact strength. It would further be advantageous if such improvements were retained after heat aging or at low temperatures, and were obtained without having a detrimental effect on other desirable properties such as transparency.

SUMMARY OF THE INVENTION

The invention relates to thermoplastic compositions comprising a blend of: from 1 to 99 weight percent of a polycarbonate comprising from 10 to 90 mole percent of one or more arylate carbonate units of the formula

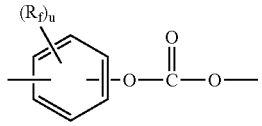

wherein each $R_f$ is independently a halogen atom, a $C_{1-12}$ hydrocarbon, or a halogen-substituted $C_{1-12}$ hydrocarbon, and u is 0 to 4; and 10 to 90 mole percent of different carbonate units of the formula

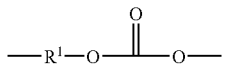

wherein at least 60% of the $R^1$ groups are $C_{6-30}$ aromatic groups; and from 1 to 99 wt % weight percent of a polyester comprising units of the formula

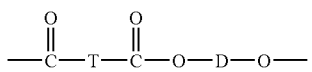

wherein T is a residue derived from a $C_5$-$C_7$ cycloaliphatic or $C_7$-$C_{12}$ aromatic dicarboxylic acid or a chemical equivalent thereof, and D is a residue derived from a $C_6$-$C_{12}$ aromatic or $C_2$-$C_{12}$ aliphatic diol or a chemical equivalent thereof, provided that at least 50 mole percent of D is derived from 1,4-cyclohexanedimethanol or a chemical equivalent thereof;

and wherein the foregoing weight percents are each based on the total weight of the polycarbonate and the polyester.

In another embodiment, a method of manufacture comprises blending the above-described polycarbonate and polyester components to form a thermoplastic composition.

In yet another embodiment, an article comprises the above-described thermoplastic composition.

In still another embodiment, a method of manufacture of an article comprises molding, extruding, or shaping the above-described thermoplastic composition to form an article.

In another embodiment, the invention relates to a composition comprising a blend of: from 20 to 80 weight percent of a polycarbonate consisting of from 20 to 80 mole percent of one or more arylate carbonate units of the formula

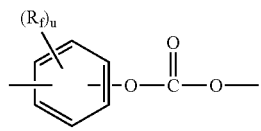

wherein each $R_f$ is independently methyl, and u is 0 to 2; and from 20 to 80 mole percent of different carbonate units of the formula

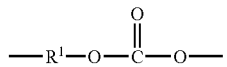

wherein $R^1$ is derived from bisphenol A; and from 20 to 80 weight percent of poly(1,4-cyclohexane-dimethanol-1,4-dicarboxylate), poly(cyclohexanedimethylene terephthalate)-co-poly(ethylene terephthalate), wherein greater than 50 mol % of the ester groups are derived from 1,4-cyclohexanedimethanol, or poly(cyclohexanedimethanol terephthalate; wherein the weight percent of the polycarbonate and the polyester are each based on the total weight of the polycarbonate and the polyester; and wherein the blend has an improved Notched Izod impact value compared to the Notched Izod value of the polycarbonate and the polyester alone, each measured in accordance with ISO 180 at 23° C.

And in another embodiment, the invention relates to a composition comprising a blend of: from 20 to 80 weight percent of a polycarbonate consisting of from 20 to 40 mole percent of one or more arylate carbonate units of the formula

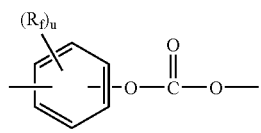

wherein $R_f$ is methyl and u is 1, from 20 to 40 mole percent of arylate carbonate units of the formula

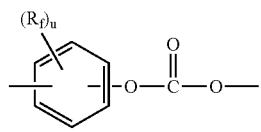

wherein u is 0, and from 20 to 80 mole percent of different carbonate units of the formula

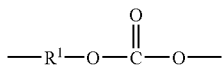

wherein $R^1$ is derived from bisphenol A; and from 20 to 80 weight percent of poly(1,4-cyclohexane-dimethanol-1,4-dicarboxylate), poly(cyclohexanedimethylene terephthalate)-co-poly(ethylene terephthalate), wherein greater than 50 mol % of the ester groups are derived from 1,4-cyclohexanedimethanol, or poly(cyclohexanedimethanol terephthalate; wherein the weight percent of the polycarbonate and the polyester are each based on the total weight of the polycarbonate and the polyester; and wherein the blend has an improved Notched Izod impact value compared to the Notched Izod value of the polycarbonate and the polyester alone, each measured in accordance with ISO 180 at 23° C.

The above described and other features are exemplified by the following detailed description.

DETAILED DESCRIPTION OF THE INVENTION

The invention is based on the unexpected discovery that blends of polycarbonates and polyesters with improved impact strength can be obtained using specific types polycarbonates, in particular polyarylates, and specific types of polyesters, in particular polyesters containing at least 50 mole percent (mol %) of 1,4-dimethylene cyclohexane groups. Certain of the blends also show improved retention of impact strength after heat aging, and/or improved low temperature impact strength. The blends further retain other advantageous properties, such as transparency.

The singular forms "a," "an," and "the" include plural referents unless the context clearly dictates otherwise. Unless defined otherwise, technical and scientific terms used herein have the same meaning as is commonly understood by one of skill. The endpoints of all ranges directed to the same component or property are inclusive of the endpoint and independently combinable. Compounds are described using standard nomenclature.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

The polycarbonates used in the blends have at least two different types repeating structural carbonate units. The first type of repeating structural unit is an arylate unit of formula (1)

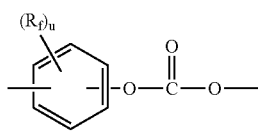
(1)

wherein each $R_f$ is independently a halogen atom, a $C_{1-12}$ hydrocarbon such as a $C_{6-12}$ aryl group or a $C_{1-10}$ alkyl group (more specifically, a $C_{1-5}$ alkyl group), a halogen-substituted $C_{1-10}$ hydrocarbon such as a $C_{6-10}$ aryl group or a halogen-substituted $C_{1-10}$ alkyl group (more specifically, a $C_{1-5}$ bromine-substituted alkyl group), and u is 0 to 4, specifically 0 to 2. Units of this type are derived from the corresponding aromatic diols of formula (2)

(2)

wherein $R_f$ and u are as defined above. The two hydroxyl groups are generally in a meta or para relationship. In one embodiment, the two hydroxyl groups are in a para relationship, give rising to para linkages in the carbonate units.

Specific exemplary aromatic diols include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, and the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,5-di-t-butylhydroquinone, 2,3,5-trimethylhydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like. A combination comprising the foregoing aromatic diols can also be use. Among these compounds, hydroquinone and 2-methyl hydroquinone can specifically be mentioned. In one embodiment, a combination of hydroquinone and 2-methyl hydroquinone is used.

In addition to the arylate units of formula (1), the polycarbonates further comprise from 10 to 90 mol % of units of formula (3)

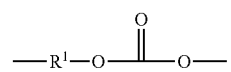
(3)

wherein $R^1$ is any divalent organic group, provided that $R^1$ is not derived from an aromatic diol of formula (2), and that at least 60% of the total number of the $R^1$ groups is a divalent $C_{6-30}$ aromatic group, with the balance being are divalent aliphatic, alicyclic, or aromatic groups. In one embodiment, each $R^1$ group is a divalent aromatic group derived from a dihydroxy compound of the formula (4)

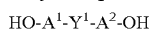
HO-$A^1$-$Y^1$-$A^2$-OH (4)

wherein each of $A^1$ and $A^2$ is a divalent aryl group, specifically a monocyclic aryl group, and $Y^1$ is a single bond or a bridging group having one or two atoms that separate $A^1$ from $A^2$. In an exemplary embodiment, one atom separates $A^1$ from $A^2$. Illustrative non-limiting examples of groups of this type are —O—, —S—, —S(O)—, —S(O)$_2$—, —C(O)—, or a saturated aliphatic or cycloaliphatic divalent hydrocarbon such as methylene, ethylidene, isopropylidene, neopentylidene, cyclohexylidene, cyclohexylmethylene, 2-[2.2.1]-bicycloheptylidene, and adamantylidene.

Included within the scope of formula (4) are bisphenol compounds of formula (5)

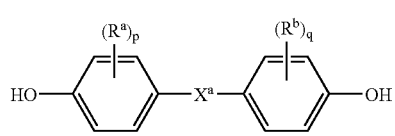

wherein $R^a$ and $R^b$ are each independently a halogen atom or a $C_{1-6}$ monovalent alkyl group, p and q are each independently integers of 0 to 4, and $X^a$ is a $C_{1-18}$ alkylene, a $C_{1-18}$ alkylidene, a $C_{3-18}$ cycloalkylidene, or a $C_{9-18}$ fused cycloalkylidene-aromatic group. For example, $X^a$ can be one of the groups of formula (6) or (7)

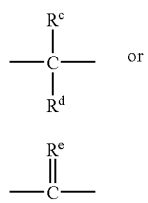

wherein $R^c$ and $R^d$ are each independently hydrogen, $C_{1-16}$ alkyl, cyclic $C_{1-12}$ alkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. In particular, $R^c$ and $R^d$ are each the same hydrogen or $C_{1-4}$ alkyl group, specifically the same $C_{1-3}$ alkyl group, even more specifically, methyl, a $C_{1-18}$ alkylidene bridging group, a $C_{3-18}$ cycloalkylidene bridging group, or a $C_{9-18}$ fused cycloalkylidene-aromatic bridging group In an embodiment, $R^c$ and $R^d$ taken together represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)-, where Z is a substituent group selected from hydrogen, hydroxy, $C_{1-12}$ alkyl, $C_{1-12}$ alkoxy, or $C_{1-12}$ acyl.

Some illustrative examples of bisphenol compounds represented by formula (5) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds can also be used.

In one specific embodiment, the polycarbonate contains 10 to 90 mol %, specifically 20 to 80 mol %, more specifically to 30 to 70 mol % of arylate units of formula (1); and 10 to 90 mol %, specifically 20 to 80 mol %, more specifically 30 to 70 mol % of aromatic carbonate units of formula (3), specifically units derived from a bisphenol of formula (5). Different arylate units can be present in the polycarbonate.

In still another specific embodiment, the polycarbonate contains 10 to 90 mol %, specifically 15 to 70 mol %, even more specifically 20 to 50 mol % of arylate units of formula (1), and 10 to 90 mol %, specifically 30 to 85 mol %, even more specifically 50 to 80 mol % of aromatic carbonate units derived from a bisphenol of formula (5). In a specific example of this embodiment, in formula (1) each $R_f$ is independently a halogen atom or a $C_{1-4}$ alkyl group, and u is 0 to 2, specifically 0 to 1, and in formula (5) $X^a$ represents a group of formula (6) wherein $R^c$ and $R^d$ are each a hydrogen or the same $C_{1-4}$ alkyl group, specifically the same $C_{1-3}$ alkyl group, even more specifically, methyl.

In another specific embodiment, the polycarbonate is a terpolymer that consists essentially of, or consists of, 30 to 90 mol %, specifically 40 to 80 mol % of a mixture of different arylate units of formula (2); and 10 to 50, specifically 20 to 40 mol % of units derived from derived from a bisphenol of formula (4). Specifically, in the terpolymer, 10 to 50 mol %, 10 to 40 mol %, or 20 to 40 mol % of polycarbonate units are derived from hydroquinone; 10 to 50 mol %, 10 to 40 mol %, or 20 to 40 mol % of the polycarbonate units are derived from 2-methyl hydroquinone; and 10 to 50, specifically 20 to 40 mol % of the polycarbonate units are derived from a bisphenol of formula (5), specifically bisphenol A. In this more specific embodiment, the terpolymer can consist essentially of these three types of carbonate units, that is, no other carbonate units are present that would substantially affect the basic and novel characteristics of the invention. Alternatively, the terpolymer can consist of these three types of units, i.e., no other types of units are present.

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000, specifically 20,000 to 100,000 as measured by gel permeation chromatography (GPC), using a crosslinked styrene-divinylbenzene column and calibrated to polycarbonate references. GPC samples are prepared at a concentration of 1 mg/ml, and are eluted at a flow rate of 1.5 ml/min.

The polycarbonate has flow properties useful for the manufacture of thin articles. Melt volume flow rate (often abbreviated MVR) measures the rate of extrusion of a thermoplastics through an orifice at a prescribed temperature and load. Polycarbonates useful for the formation of thin articles can have an MVR, measured at 300° C./1.2 kg, of 0.5 to 60 cubic centimeters per 10 minutes (cc/10 min), specifically 3 to 30 cc/10 min. Combinations of polycarbonates of different flow properties can be used to achieve the overall desired flow property.

Suitable polycarbonates are generally transparent, for example provide transparent articles after extruding, shaping, and/or molding. In one embodiment the polycarbonate has a haze of less than 10.0% when molded into a 2.5 mm thick color chip, as determined by ASTM-1003. In another embodiment, the polycarbonate has a haze of less than 5.0% when molded into a 2.5 mm thick color chip, as determined by ASTM-1003.

Polycarbonates can be manufactured by processes such as interfacial polymerization and melt polymerization as is known in the art. Branched polycarbonates can be used, which can be prepared by adding a branching agent during polymerization. A chain stopper (also referred to as a capping agent) can be included during polymerization to control the molecular weight of the polycarbonate. Exemplary chainstoppers include certain mono-phenolic compounds (e.g., p-cumyl-phenol), mono-carboxylic acid chlorides (e.g., benzoyl chloride), and monochloroformates (e.g., phenyl chloroformate).

The blends further comprise polyesters comprising repeating units of formula (8)

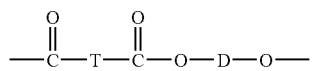
(8)

wherein T is a divalent residue derived from a $C_5$-$C_7$ cycloaliphatic or $C_7$-$C_{12}$ aromatic dicarboxylic acid or a chemical equivalent thereof, and D is a divalent residue derived from a $C_6$-$C_{12}$ aromatic or $C_2$-$C_{12}$ aliphatic diol or a chemical equivalent thereof, provided that at least 50 mole percent of D is derived from 1,4-cyclohexanedimethanol or an equivalent thereof.

Examples of aromatic dicarboxylic acids that can be used to prepare the polyester units include isophthalic acid, terephthalic acid, 1,2-di(p-carboxyphenyl)ethane, 4,4'-dicarboxydiphenyl ether, 4,4'-bisbenzoic acid, and combinations comprising at least one of the foregoing acids. Dicarboxylic acids containing fused rings can also be used, such as 1,4-, 1,5-, or 2,6-naphthalenedicarboxylic acids. Exemplary cycloaliphatic dicarboxylic acids include decahydronaphthalene dicarboxylic acids, norbornene dicarboxylic acids, bicyclooctane dicarboxylic acids, 1,4-cyclohexanedicarboxylic acid, and the like. As used herein, a "chemical equivalent" of a carboxylic acid is the corresponding anhydride, acid chloride, acid bromide, carboxylate salt, or ester, e.g., a $C_{1-8}$ ester such as a methyl ester, phenyl ester, or the like.

Specific dicarboxylic acids are terephthalic acid, isophthalic acid, naphthalene dicarboxylic acid, 1,4-cyclohexane dicarboxylic acid (cis or trans), or combinations thereof. A specific dicarboxylic acid comprises a combination of isophthalic acid and terephthalic acid wherein the weight ratio of isophthalic acid to terephthalic acid is 91:9 to 2:98.

Suitable $C_6$-$C_{12}$ aromatic diols include but are not limited to the diols of formula (2), for example resorcinol, hydroquinone, and pyrocatechol, as well as diols such as 1,5-naphthalene diol, 2,6-naphthalene diol, 1,4-napthalene diol, 4,4'-dihydroxybiphenyl, bis(4-hydroxyphenyl)ether, bis(4-hydroxyphenyl)sulfone, and the like, and combinations comprising at least one of the foregoing aromatic diols.

Exemplary $C_2$-$C_{12}$ aliphatic diols include but are not limited to 1,2-ethylene glycol, 1,2- and 1,3-propylene glycol, 2,2-dimethyl-1,3-propane diol, 2-ethyl-2-methyl-1,3-propane diol, 1,3- and 1,5-pentane diol, dipropylene glycol, 2-methyl-1,5-pentane diol, 1,6-hexane diol, dimethanol decalin, dimethanol bicyclooctane, 1,4-cyclohexane dimethanol and its cis- and trans-isomers, triethylene glycol, 1,10-decane diol, and the like, and combinations comprising at least one of the foregoing aliphatic diols. As used herein, a "chemical equivalent" of a an alcohol is the corresponding ester, specifically a $C_{1-8}$ ester such as an acetate ester.

As stated above, at least 50 mole percent of D is derived from 1,4-cyclohexanedimethanol or a chemical equivalent thereof. In one embodiment, all of the D groups are derived from an aliphatic or cycloaliphatic diol or chemical equivalent thereof.

A specific class of polyesters within the scope of formula (8) are the poly(cycloalkylene phthalate)s such as poly(cyclohexanedimethanol terephthalate) (PCT), having recurring units of formula (9)

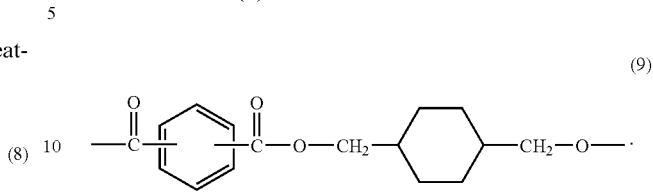
(9)

In one embodiment, the phenylene ring is derived from a combination of isophthalic acid and terephthalic acid wherein the weight ratio of isophthalic acid to terephthalic acid is 91:9 to 2:98.

Another specific class of polyesters within the scope of formula (8) are the poly(cycloalkylene cycloalkanoate)s where T and D each contain cycloalkyl groups. In one embodiment, T is derived from cyclohexane dicarboxylic acid and at least 50 mol % of D is derived from 1,4-cyclohexane dimethanol, and 0-50 mol % of D is derived from a divalent group derived from 1,6-hexane diol, dimethanol decalin, dimethanol bicyclooctane, trans-isomers, 1,10-decane diol, and the like. A particularly useful poly(cycloalkylene cycloalkanoate) is poly(cyclohexane-1,4-dimethylene cyclohexane-1,4-dicarboxylate), also referred to as poly(1,4-cyclohexanedimethanol-1,4-dicarboxylate) (PCCD), having recurring units of formula (10)

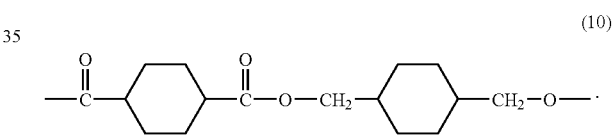
(10)

The cis or trans isomers (or a mixture thereof) of cyclohexane can be used.

Other useful polyesters are copolyesters derived from an aromatic dicarboxylic acid and a combination of a linear aliphatic diol (in particular ethylene glycol, butylene glycol, poly(ethylene glycol) or poly(butylene glycol)) with 1,4-cyclohexane dimethanol. The ester units comprising the linear aliphatic or cycloaliphatic ester units can be present in the polymer chain as individual units, or as blocks of the same type of units. A specific ester of this type is poly(cyclohexanedimethylene terephthalate)-co-poly(ethylene terephthalate) (PCTG) wherein greater than 50 mol % of the ester groups are derived from 1,4-cyclohexanedimethanol.

The polyesters can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

The polyesters can have an intrinsic viscosity, as determined in chloroform at 25° C., of 0.3 to 1.5 deciliters per gram (dl/gm), specifically 0.45 to 1.0 dl/gm. The polyesters can have a weight average molecular weight of 10,000 to 200,000, specifically 20,000 to 100,000 as measured by gel permeation chromatography (GPC).

The relative ratios of the polycarbonate and the polyester will depend on the desired characteristics of the compositions. In general, the thermoplastic compositions comprise 1 to 99 weight percent (wt. %), specifically 20 to 80 wt. % polycarbonate and 1 to 99 wt. %, specifically 20 to 80 wt. % polyester.

It is further desirable for the polycarbonate-polyester blends to have an MVR of 5 to 150 cc/10 min, specifically 7 to 125 cc/10 min, more specifically 9 to 110 cc/10 min, and still more specifically 10 to 100 cc/10 min, measured at 300° C. and a load of 1.2 kilograms, or at 265° C. or 295° C. and a load of 2.2 kilograms according to ASTM D1238-04.

It has been found that the polycarbonate-polyester blends can have good optical characteristics, in particular good light transparency. A molded sample of the blend can have a luminous transmittance of 60% or greater, 70% or greater, more specifically 70 to 90%, measured according to ASTM D 1003-00 using a 2.5 mm thick color chip.

The polycarbonate-polyester blends are also tough, having improved notched Izod impact values relative to each component alone, or blends based on homopolycarbonates, when measured in accordance with ISO 180 at 23° C. Generally, the Notched Izod of the blends is 5% or more higher than the Notched Izod value of the polyester or the polycarbonate alone. In another embodiment, the improved Notched Izod of the blend is an amount from 5% to 100% higher, or more, of the Notched Izod value of the polycarbonate or polyester alone. It has further unexpectedly been found that certain of these blends have improved retention of Notched Izod after heat aging, and/or improve low temperature Notched Izod impact strength. These improvements can be observed for blends comprising polycarbonates containing arylate units derived only from hydroquinone, as well as terpolymers containing arylate units derived from hydroquinone and methylhydroquinone. The improvements are also observed for blends comprising poly(cycloalkylene cycloalkanoates) such as PCCD, blends comprising poly(cycloalkylene phthalate)s such as PCT, and copolyesters derived from an aromatic dicarboxylic acid and a mixture of linear aliphatic diols and cycloaliphatic diols such as PCTG.

In particular, blends comprising the polycarbonate and a poly(cycloalkylene cycloalkanoate) such as PCCD can have an improved Notched Izod impact value compared to each component alone. In another embodiment, the improved Notched Izod of the blend is an amount from 5% to 100% higher, or more, of the Notched Izod value of the polycarbonate or polyester alone.

These blends can also have improved retention of Notch Izod impact strength after heat aging. After heat aging at 90° C. for 15 hours, retention of 50% or more of the initial Notched Izod Impact is observed for blends comprising 40 to 80 wt. % of polycarbonate terpolymers containing arylate units derived from hydroquinone and methylhydroquinone and 20 to 60 weight percent of PCCD, as well as for blends comprising 55 to 65 wt. % of polycarbonates containing arylate units derived only from hydroquinone and 35 to 45 wt. % of a poly(cycloalkylene cycloalkanoate) such as PCCD.

Blends comprising the polycarbonate and a copolyester such as PCTG also have an improved Notched Izod impact value compared to each component alone. In another embodiment, the improved Notched Izod of the blend is an amount from 5% to 100% higher, or more, of the Notched Izod value of the polycarbonate or polyester alone.

These blends can also have improved retention of Notch Izod impact strength. After heat aging at 90° C. for 15 hours, retention of 50% or more of the initial Notched Izod Impact is observed for blends comprising 65 to 85 wt. % of polycarbonate terpolymers containing arylate units derived from hydroquinone and methylhydroquinone and 15 to 35 wt. % of a copolyester such as PCTG.

Blends comprising the polycarbonate and a poly(cycloalkylene phthalate)s such as PCT also have an improved Notched Izod impact value compared to each component alone. In another embodiment, the improved Notched Izod of the blend is an amount from 5% to 100% higher, or more, of the Notched Izod value of the polycarbonate or polyester alone.

These blends can also have improved retention of Notch Izod impact strength. After heat aging at 90° C. for 15 hours, retention of 50% or more of the initial Notched Izod Impact is observed for blends comprising 50 to 85 wt. % of polycarbonate terpolymers containing arylate units derived from hydroquinone and methylhydroquinone and 15 to 50 wt. % of a poly(cycloalkylene phthalate)s such as PCT.

Blends comprising polycarbonate terpolymers and a poly(cycloalkylene phthalate)s such as PCT can further have good low temperature impact properties, for example a Notched Izod of 20 or greater, measured in accordance with ISO-180 at 0° C.

In addition to the polycarbonate and polyester as described above, the thermoplastic composition can include various additives ordinarily incorporated in resin compositions of this type, with the proviso that the additives are selected so as to not significantly adversely affect the desired properties of the thermoplastic composition. Exemplary additives include impact modifiers, fillers, antioxidants, thermal stabilizers, light stabilizers, ultraviolet light (UV) absorbing additives, quenchers, plasticizers, lubricants, mold release agents, antistatic agents, dyes, pigments, light effect additives, flame retardants, anti-drip agents, and radiation stabilizers. Combinations of additives can be used. Such additives can be mixed at a suitable time during the mixing of the components for forming the composition. Impact modifiers are generally present in amounts of 2 to 30 wt. %, based on the total weight of the polymers in the composition. Fillers, if present, are used in amounts low enough to not substantially adversely affect the desired optical properties of the compositions. Other additives are generally present in an amount from 0.01 to 5 wt. %, based on the total weight of the composition, excluding any fillers.

Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used. Specific impact modifiers include a natural rubber, a low-density polyethylene, a high-density polyethylene, a polypropylene, a polystyrene, a polybutadiene, a styrene-butadiene copolymer, a styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), a styrene-acrylonitrile (SAN), an ethylene-propylene copolymer, an ethylene-propylene-diene terpolymer, an ethylene-methyl acrylate copolymer, an ethylene-ethyl acrylate copolymer, an ethylene-vinyl acetate copolymer, an ethylene-glycidyl methacrylate copolymer, a polyethylene terephthalate-poly(tetramethyleneoxide)glycol block copolymer, a polyethylene terephthalate/isophthalate-poly(tetramethyleneoxide)glycol block copolymer, a silicone rubber, or a combination comprising at least one of the foregoing impact modifiers.

components of lighting fixtures, ornaments, household appliances, roofs, greenhouses, sun rooms, swimming pool enclosures, and the like.

The thermoplastic polycarbonate-polyester blends are further illustrated by the following non-limiting examples.

EXAMPLES

Examples 1-67

The following materials, preparation procedures, and testing procedures were used in the Examples 1-67.

Materials

The materials used in the Examples are listed below. All blend components in the tables mentioned in the examples in percent by weight, based on the total weight of the blend components. Components are shown in the Table 1 below.

TABLE 1

| Acronym | Component | Source |
|---|---|---|
| PC | BPA polycarbonate resin (Mw = 30,000, using polycarbonate standards) | GE Plastics |
| PCTG | Poly(ethylene terephthalate)-co-(1,4-cyclohexanedimethylene terephthalate) (20 mol % ethylene units and 80 mol % 1,4-cyclohexanedimethylene units (Mw = 70,000 using polystyrene standards | Eastman Chemical Co. |
| PCCD | Poly(cyclohexane-1,4-dimethylene cyclohexane-1,4-dicarboxylate) (Mw = 80,000 grams per mole) | Eastman Chemical Co. |
| PCT | Poly(1,4-cyclohexanedimethylene terephthalate), Mw = 70,000 grams per mole using polystyrene standards | Eastman Chemical Co. |
| 30HQ | Hydroquinone/bisphenols-A polycarbonate copolymer, having a 30:70 mole ratio of hydroquinone to bisphenols-A (Mw = 28,500 using polycarbonate standards | GE Plastics |
| MeHQ/HQ/BPA | Methylhydroquinone/hydroquinone/bisphenols-A polycarbonate terpolymer, having a 33:34:33 mole ratio of methylhydroquinone to bisphenol-A (Mw = 28,500 using polycarbonate standards | GE Plastics |

The thermoplastic compositions can be manufactured by various methods. For example, powdered polycarbonate, polyester, and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a side-stuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Shaped, formed, or molded articles comprising the polycarbonate-polyester blends are also provided. The blends, and thermoplastic compositions comprising the blends, can be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and Preparation Processes/Techniques The compositions used in the Examples were made as follows. All thermoplastic compositions except where indicated were compounded on a 25 mm Werner and Pfleiderer co-rotating twin screw extruder with a vacuum vented mixing screw, at a barrel and die head temperature between 240 and 265° C., and a screw speed of 150 to 300 revolutions per minute. The extruder had eight independent feeders, and can be operated at a maximum rate of 300 pounds per hour. The twin-screw extruder had enough distributive and dispersive mixing elements to produce good mixing between the polymer compositions. The extrudate was cooled through a water bath, and then pelletized. The compositions are subsequently molded according to ISO 294 on an Engel injection-molding machine with a set temperature of approximately 240 to 290° C. The pellets were dried for 3 to 4 hours at approximately 80° C. in a forced-air circulating oven prior to injection molding. It will be recognized by one skilled in the art that the method is not limited to these temperatures or to this apparatus.

Testing Processes/Techniques

Melt volume rate (MVR) was determined using pellets dried for 2 hours at 80° C., in accordance with ISO 1133 at 265° C. at a load of 2.16 kg or 295° C. at a load of 2.2 kg, at dwelling time of 240 seconds and 0.0825 inch (2.1 mm) orifice, and is reported in cubic centimeters per 10 minutes ($cm^3/10$ min).

Izod notched impact ("INI") was measured on 80×10×4 mm (length×wide×thickness) impact bars at 23° C. according to ISO 180, using a 5.5 Joule pendulum, and is reported in kilojoules per squared meter (kJ/m$^2$).

Haze and luminous transmittance (LT) were measured according ASTM D 1003 using a 2.5 mm color chip, and are reported in percentages (%).

Heat aging the test samples was accomplished by heating them at 90° C. for 15 hours. The samples were then allowed to cool to 23° C., and the notched Izod after heat aging was measured as described above.

Comparative Examples 1-5 and Examples 18-39

In the examples below, Examples 1-5 are comparative examples and Examples 18-39 are non-comparative examples, which illustrate different embodiments of the invention. The compositions shown in Examples 1-5 and Examples 18-39 were prepared and tested in accordance to the procedures described above.

Results

The results of Examples 1-5 and Examples 18-39 are shown in Tables 2-7 below.

TABLE 2

Binary Blends of the 30HQ copolymer with PCCD

| | Ex. No. | | | | | |
|---|---|---|---|---|---|---|
| | 1 | 2 | 18 | 19 | 20 | 21 |
| % PCCD | 100 | | 20 | 40 | 60 | 80 |
| % 30 HQ | | 100 | 80 | 60 | 40 | 20 |
| INI at 23° C. | 22 | 63 | 71 | 74 | 83 | 88 |
| Haze | 1.5 | 0.9 | 1.7 | 1.5 | 2.1 | 2.8 |
| LT | 85 | 87.5 | 88.5 | 89.2 | 89.7 | 89.7 |

TABLE 3

Binary blends of the 30HQ copolymer with PCTG

| | Ex. No. | | | | |
|---|---|---|---|---|---|
| | 3 | 2 | 22 | 23 | 24 |
| % PCTG | 100 | | 20 | 40 | 80 |
| % 30HQ | | 100 | 80 | 60 | 20 |
| INI at 23° C. | 4 | 63 | 68 | 78 | 82 |
| Haze | — | 0.9 | 1.4 | 3.1 | 0.8 |
| LT | — | 87.5 | 87.7 | 86.1 | 86.7 |

TABLE 4

Binary blends of the 30 HQ copolymer with PCT

| | Ex. No. | | | | | |
|---|---|---|---|---|---|---|
| | 4 | 2 | 25 | 26 | 27 | 28 |
| % PCT | 100 | | 20 | 40 | 60 | 80 |
| % 30HQ | | 100 | 80 | 60 | 40 | 20 |
| INI at 23° C. | 2 | 63 | 64 | 69 | 73 | 91 |
| Haze | 100 | 0.9 | 1.6 | 3.1 | 1.9 | 65.9 |
| LT | <30 | 87.5 | 87.9 | 86.4 | 87.2 | 64.4 |

TABLE 5

Binary blends of the MQ/HQ/BPQ terpolymer with PCTG

| | Ex. No. | | | | | |
|---|---|---|---|---|---|---|
| | 1 | 5 | 29 | 30 | 31 | 32 |
| % PCCD | 100 | | 20 | 40 | 60 | 80 |
| % terpolymer | | 100 | 80 | 60 | 40 | 20 |
| INI at 23° C. | 22 | 50 | 62 | 74 | 85 | 88 |
| Haze | 1.5 | 1.8 | 1.4 | 2.2 | 2.7 | 5.3 |
| LT | 85 | 81.8 | 85.8 | 85.6 | 87.1 | 89.1 |

TABLE 6

Binary Blends of the MQ/HQ/BPA terpolymer with PCTG

| | Ex. No. | | | | | |
|---|---|---|---|---|---|---|
| | 3 | 5 | 33 | 34 | 35 | 36 |
| % PCTG | 100 | | 20 | 40 | 60 | 80 |
| % terpolymer | | 100 | 80 | 60 | 40 | 20 |
| INI at 23° C. | 4 | 50 | 60 | 74 | 84 | 105 |
| Haze | | 1.8 | 1.5 | 3.5 | 1.5 | 1.1 |
| LT | | 81.8 | 85.2 | 83.9 | 86.7 | 86.0 |

TABLE 7

Binary blends of the MQ/HQ/BPA terpolymer with PCT

| | Ex. No. | | | | |
|---|---|---|---|---|---|
| | 4 | 5 | 37 | 38 | 39 |
| % PCT | 100 | | 20 | 60 | 80 |
| % terpolymer | | 100 | 80 | 40 | 20 |
| INI at 23° C. | 2 | 50 | 47 | 61 | 5 |
| Haze | 100 | 1.8 | 2.2 | 2.1 | 66.0 |
| LT | <30 | 81.8 | 85.2 | 85.6 | 65.0 |

Discussion

The results of Comparative Examples 1-5 and inventive examples 18-39 (Tables 2-7) illustrated the Notched Izod Impact energy observed at room temperature for blends of PCCD, PCTG and PCT with either the 30HQ copolymer or the MQ/HQ/BPA terpolymer while maintaining transparency, as reflected by light transmission (LT). The Notched Izod values observed for the blend (Examples 18-39) were much higher than at least one of the individual building blocks (Examples 1-5).

Further, as can be seen from the results in Tables 2-7, formulations with 20/80, 40/60, 60/40, and 80/20 weight ratios of polyester/polycarbonate copolymer and terpolymers were made and tested. It was found that compared to the individual components (30HQ copolymer, MQ/HQ/BPA terpolymer or the pure polyesters (PCCD, PCTG)), the blends of PCCD/30HQ (examples 18-21), PCCD/terpolymer (examples 29-32), PCTG/30HQ (examples 22-24) and PCTG/terpolymer (examples 33-36) at the aforementioned binary blend ratios (20/80-80/20) had a higher impact (INI-ISO 180) energy at 23° C. Similar results were obtained at a ratio of 60/40 (Example 38) when the polyester in the blend was PCT.

Comparative Examples 6-17 and Examples 18-39

In the examples below, Examples 6-17 are comparative examples and Examples 18-39 are non-comparative examples. The compositions described in Examples 6-17 and Examples 18-39 were prepared and tested in accordance to the procedures described above.

Results

The results for these Examples are shown in Table 8 to Table 13.

TABLE 8

Comparison of impact performance of binary blends of 30HQ copolymer with PCCD vs. binary blends of PCCD and PC

| | Ex. No. | | | | | | | |
|---|---|---|---|---|---|---|---|---|
| | 6 | 18 | 7 | 19 | 8 | 20 | 9 | 21 |
| % PCCD | 20 | 20 | 40 | 40 | 60 | 60 | 80 | 80 |
| % PC | 80 | | 60 | | 40 | | 20 | |
| % 30HQ | | 80 | | 60 | | 40 | | 20 |
| INI at 23° C. | 25.2 | 71.1 | 9.9 | 73.9 | 70.0 | 83.2 | 88.6 | 88.1 |
| Haze | 1.2 | 1.7 | 1.0 | 1.5 | 1.4 | 2.1 | 2.3 | 2.8 |
| LT | 88.2 | 88.5 | 89.5 | 89.2 | 89.8 | 89.7 | 90.4 | 89.7 |

TABLE 9

Comparison of impact performance of binary blends of 30HQ copolymer with PCTG vs. binary blends of PCTG with PC

| | Ex. No. | | | | | |
|---|---|---|---|---|---|---|
| | 10 | 22 | 11 | 23 | 12 | 24 |
| % PCTG | 20 | 20 | 40 | 40 | 80 | 80 |
| % PC | 80 | | 60 | | 20 | |
| % 30HQ | | 80 | | 60 | | 20 |
| INI at 23° C. | 11 | 68 | 9 | 78 | 47 | 82 |
| Haze | 1.5 | 1.4 | 2.8 | 3.1 | 1.0 | 0.8 |
| LT | 87.6 | 87.7 | 87.6 | 86.1 | 87.6 | 86.7 |

TABLE 10

Comparison of impact performance of binary blends of 30HQ copolymer with PCT vs. binary blends of PCT with PC

| | Ex. No. | | | | | | | |
|---|---|---|---|---|---|---|---|---|
| | 13 | 25 | 14 | 26 | 15 | 27 | 16 | 28 |
| % PCT | 20 | 20 | 40 | 40 | 60 | 60 | 80 | 80 |
| % PC | 80 | | 60 | | 40 | | 20 | |
| % 30HQ | | 80 | | 60 | | 40 | | 20 |
| INI at 23° C. | 24 | 64 | 12 | 69 | 15 | 73 | 65 | 91 |
| Haze | 1.9 | 1.6 | 3.3 | 3.1 | 1.2 | 1.9 | 51 | 66 |
| LT | 87.4 | 87.9 | 87.3 | 86.4 | 87.4 | 87.2 | | 64 |

TABLE 11

Comparison of impact performance of binary blends of terpolymer with PCCD vs. binary blends of PCCD-PC

| | Ex. No. | | | | | | | |
|---|---|---|---|---|---|---|---|---|
| | 6 | 29 | 7 | 30 | 8 | 31 | 9 | 32 |
| % PCCD | 20 | 20 | 40 | 40 | 60 | 60 | 80 | 80 |
| % PC | 80 | | 60 | | 40 | | 20 | |
| % terpolymer | | 80 | | 60 | | 40 | | 20 |
| INI at 23° C. | 25.2 | 61.8 | 9.9 | 73.9 | 70.0 | 84.9 | 88.6 | 88.0 |
| Haze | 1.2 | 1.4 | 1.0 | 2.2 | 1.4 | 2.7 | 2.3 | 5.3 |
| LT | 88.2 | 85.8 | 89.5 | 85.6 | 89.8 | 87.1 | 90.4 | 89.1 |

TABLE 12

Comparison of impact performance of binary blends of terpolymer with PCTG vs. binary blends of PCTG with PC

| | Ex. No. | | | | | | | |
|---|---|---|---|---|---|---|---|---|
| | 10 | 33 | 11 | 34 | 17 | 35 | 12 | 36 |
| % PCTG | 20 | 20 | 40 | 40 | 60 | 60 | 80 | 80 |
| % PC | 80 | | 60 | | 40 | | 20 | |
| % terpolymer | | 80 | | 60 | | 40 | | 20 |
| INI at 23° C. | 11 | 60 | 9 | 74 | 12 | 84 | 47 | 105 |
| Haze | 1.5 | 1.5 | 2.8 | 3.5 | 1.0 | 1.5 | 1.0 | 1.1 |
| LT | 87.6 | 85.2 | 87.6 | 83.9 | 87.1 | 86.7 | 87.6 | 86.0 |

TABLE 13

Comparison of impact performance of binary blends of terpolymer with PCT vs. binary blends of PCT with PC

| | Ex. No. | | | | | |
|---|---|---|---|---|---|---|
| | 13 | 37 | 15 | 38 | 16 | 39 |
| % PCT | 20 | 20 | 60 | 60 | 80 | 80 |
| % PC | 80 | | 40 | | 20 | |
| % terpolymer | | 80 | | 40 | | 20 |
| INI at 23° C. | 24 | 47 | 15 | 61 | 65 | 5 |
| Haze | 1.9 | 2.2 | 1.2 | 2.1 | 51 | 66 |
| LT | 87.4 | 85.2 | 87.4 | 85.6 | 69 | 64 |

Discussion

The results of Comparative Examples 6-17 and inventive examples 18-39 (Tables 8-13) show that the Notched Izod Impact energy observed at room temperature for blends of PCCD, PCTG and PCT with either the 30HQ copolymer or the MQ/HQ/BPA terpolymer while maintaining optical properties is much higher than that observed for blends of PCCD, PCTG or PCT with a polycarbonate homopolymer (PC).

Comparative Examples 6-17 and Examples 40-58

In the examples below, Examples 40-58 are non-comparative examples illustrating different embodiments of the invention. The compositions described in Examples 6-17 and Examples 18-39 were prepared and tested in accordance to the procedures described above. The samples were heat aged at 90° C. for 15 hours.

Results

The results for Examples 40-58 are summarized in Tables 14-20. An "X" in the table indicates that the bars were too distorted to measure.

TABLE 14

Binary blends of 30HQ copolymer with PCCD - effect of heat aging

| | Ex. No. | | | |
|---|---|---|---|---|
| | 40 | 41 | 42 | 43 |
| % PCCD | 20 | 40 | 60 | 80 |
| % 30HQ | 80 | 60 | 40 | 20 |
| INI at 23° C. | 71.1 | 73.9 | 83.2 | 88.1 |
| INI HA 90° C., 15 hrs | 11.4 | 8.0 | 85.2 | X |
| % retention | 16% | 11% | 102% | X |
| Haze | 1.7 | 1.5 | 2.1 | 2.8 |
| LT | 88.5 | 89.2 | 89.7 | 89.7 |

TABLE 15

Binary blends of 30HQ-copolymers with PCTG - effect of heat aging

| | Ex. No. | | | |
|---|---|---|---|---|
| | 44 | 45 | 46 | 47 |
| % PCTG | 20 | 40 | 60 | 80 |
| % 30HQ | 80 | 60 | 40 | 20 |
| INI at 23° C. | 68 | 78 | 57 | 82 |
| INI HA 90° C., 15 hrs | 11 | 9 | 8 | 10 |
| % retention | 17% | 12% | 14% | 12% |
| Haze | 1.4 | 3.1 | 0.7 | 0.8 |
| LT | 87.7 | 86.1 | 87.0 | 86.7 |

TABLE 16

Binary blends of 30HQ-copolymers with PCT - effect of heat aging

| | Ex. No. | | |
|---|---|---|---|
| | 48 | 49 | 50 |
| % PCT | 20 | 40 | 60 |
| % 30HQ | 80 | 60 | 40 |
| INI at 23° C. | 64 | 69 | 73 |
| INI HA 90° C., 15 hrs | 43 | 12 | 9 |
| % retention | 68% | 18% | 13% |
| Haze | 1.6 | 3.1 | 1.9 |
| LT | 87.9 | 86.4 | 87.2 |

TABLE 17

Binary blends of terpolymer with PCCD - effect of heat aging

| | Ex. No. | | | |
|---|---|---|---|---|
| | 51 | 52 | 53 | 54 |
| % PCCD | 20 | 40 | 60 | 80 |
| % terpolymer | 80 | 60 | 40 | 20 |
| INI at 23° C. | 61.8 | 73.9 | 84.9 | 88.0 |
| INI HA 90° C., 15 hrs | 46.3 | 49.3 | 90.7 | X |
| % retention | 75% | 67% | 107% | X |
| Haze | 1.4 | 2.2 | 2.7 | 5.3 |
| LT | 85.8 | 85.6 | 87.1 | 89.1 |

TABLE 18

Binary blends of terpolymer with PCTG - effect of heat aging

| | Ex. No. | |
|---|---|---|
| | 55 | 56 |
| % PCTG | 20 | 40 |
| % terpolymer | 80 | 60 |
| INI at 23° C. | 60 | 74 |
| INI HA 90° C., 15 hrs | 57 | 14 |
| % retention | 95% | 20% |
| Haze | 1.5 | 3.5 |
| LT | 85.2 | 83.9 |

TABLE 19

Binary blends of terpolymer with PCT - effect of heat aging

| | Ex. No. | |
|---|---|---|
| | 57 | 58 |
| % PCT | 20 | 60 |
| % terpolymer | 80 | 40 |
| INI at 23° C. | 47 | 61 |
| INL HA 90° C., 15 hrs | 47 | 14 |
| % retention | 102% | 22% |
| Haze | 2.2 | 2.1 |
| LT | 85.2 | 85.6 |

Discussion

These results illustrate that the improved heat aging impact properties observed with blends of PCCD, PCTG, and PCT with either the 30HQ copolymer or the terpolymer at certain ratios. As can be seen from the data in Tables 14-19, terpolymer/PCCD blends show greater than 50% retention of NI properties in ratios of 80/20 to 40/60 (Examples 51-53). Blends of 30HQ/PCCD show similar behavior at a ratio of 40/60 (Example 42). This is not observed at ratios of 60/40 nor 20/80 (examples 40, 41, 43). Blends of 30HQ/PCTG fail to show retention of NI properties over the entire range of compositions studied (examples 44-47). Blends of 30HQ/PCT show retention of NI properties at a ratio of 80/20 (example 48) while other blends fail to show this behavior (Examples 49, 50).

Terpolymer-PCTG blends (80/20, example 55) display retention of NI properties on heat aging. This is lost when the PCTG is at or exceeds a level of 40% (example 56).

Terpolymer-PCT blends display retention of NI properties on heat aging at a ratio of 80/20 (Example 57). This is lost when PCT exceeds 20% (Example 58).

Examples 59-65

In the Examples below, Examples 59-65 illustrate different embodiments of the invention. More particularly, Examples 59-65 (Tables 20-21) illustrate the retention of impact properties at lower temperatures in blends of PCT with the terpolymer or the 30HQ copolymer at certain ratios.

Results

The results of the Examples are tabulated below in Tables 20 and 21.

TABLE 20

Binary blends of 30HQ copolymer with PCT

| | Ex. No. | |
|---|---|---|
| | 59 | 60 |
| % PCT | 15 | 25 |
| % PC | — | — |
| % 30 HQ | 85 | 75 |
| INI at 23° C. | 72 | 65 |
| INI at 0° C. | 70 | 29 |
| % retention | 97 | 45 |
| Haze | 1.2 | 1.6 |
| LT | 88.4 | 88.3 |

TABLE 21

Binary blends of the terpolymer with PCT

| | Ex. No. | | | | |
|---|---|---|---|---|---|
| | 61 | 62 | 63 | 64 | 65 |
| % PCT | 60 | 50 | 25 | 20 | 15 |
| % PC | — | — | — | — | — |
| % terpolymer | 40 | 50 | 75 | 80 | 85 |
| INI at 23° C. | 61 | 41 | 63 | 47 | 63 |
| INI at 0° C. | 12 | 15 | 58 | 23 | 43 |
| % retention | 20 | 37 | 92 | 50 | 68 |
| Haze | 2.1 | 2.5 | 1.8 | 2.2 | 1.8 |
| LT | 85.6 | 86.5 | 88.0 | 85.2 | 88.0 |

Discussion

The data in Tables 20 and 21 show that low temperature ductility was lost when the PCT was present in an amount of 60 wt. % (examples 61-65) in the terpolymer blends. Low temperature ductility dropped when the PCT level was 25% in blends with the 30HQ copolymer (Examples 60, 59).

Examples 66-67

Examples 66-67 illustrate the improved chemical resistance observed with these inventive blends versus known blends of PCTG with PC. The chemical resistance tests were conducted by placing tensile bars on 1% constant strain jigs for 24 hours at room temperature. The three solvents used for testing included (i) a glass cleaning solvent (WINDEX® from SC Johnson); (ii) oleic acid; and (iii) a lubricant (WD40).

TABLE 22

Binary blends of 30HQ-20R with PCTG

| | Ex. No. | |
|---|---|---|
| | 66 | 67 |
| % PCTG | 25 | 25 |
| % PC | 75 | — |
| % 30HQ-20R | — | 75 |
| % EB retention (Oleic Acid) | 4 | 95 |
| % EB retention (Windex) | 20 | 95 |
| % EB retention (WD40) | 23 | 95 |

The results in table 22 indicate improved ESCR (environment stress cracking resistance) compared to blends of PCTG with PC, as reflected by improved retention in the tensile elongation at break (% EB) after exposure to different solvents. It can be clearly seen that the 30HQ-20R-PCTG blends have a minimal loss in % EB compared to the PCTG/PC blends.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein. All references cited herein are incorporated herein by reference.

What is claimed is:

1. A composition comprising a blend of:
from 1 to 99 weight percent of a polycarbonate comprising from 10 to 90 mole percent of one or more arylate carbonate units of the formula

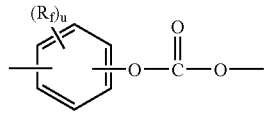

wherein each $R^f$ is independently a halogen atom, a $C_{1-10}$ hydrocarbon or a halogen-substituted $C_{1-10}$ hydrocarbon and u is 0 to 4, and from 10 to 90 mole percent of different carbonate units of the formula

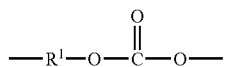

wherein at least 60% of the $R^1$ groups are $C_{6-30}$ aromatic groups, and from 1 to 99 weight percent of a polyester comprising units of the formula

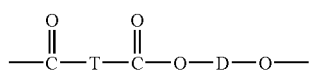

wherein T is a residue derived from a $C_5$-$C_7$ cycloaliphatic or $C_7$-$C_{12}$ aromatic dicarboxylic acid or a chemical equivalent thereof, and D is a residue derived from a $C_6$-$C_{12}$ aromatic or $C_2$-$C_{12}$ aliphatic diol or a chemical equivalent thereof, provided that at least 50 mole percent of D is derived from 1,4-cyclohexanedimethanol or a chemical equivalent thereof; and wherein the weight percent of the polycarbonate and the polyester are each based on the total weight of the polycarbonate and the polyester.

2. The composition of claim 1, wherein a sample having a thickness of 2.5 mm has a luminous transmittance which exceeds 60%, measured in accordance with ASTM D 1003.

3. The composition of claim 1, wherein the blend has an improved Notched Izod impact value compared to the Notched Izod value of the polycarbonate and the polyester alone, each measured in accordance with ISO 180 at 23° C.

4. The composition of claim 1, wherein the polycarbonate comprises from 20 to 80 mole percent of the carbonate units of the formula

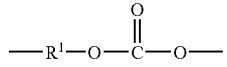

wherein $R^1$ is derived from a bisphenol of the formula

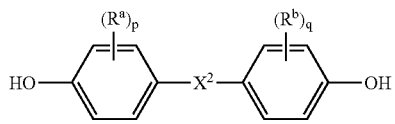

wherein $R^a$ and $R^b$ are each independently a halogen or a $C_{1-12}$ alkyl, $X^a$ is a $C_{1-18}$ alkylene, a $C_{1-8}$ alkylidene, a $C_{3-18}$ cycloalkylidene, or a $C_{9-18}$ fused cycloalkylidene-aromatic group, and p and q are each independently 0 to 4.

5. The composition of claim 1, wherein the polycarbonate is a terpolymer that consists essentially of 10 to 40 mole percent of arylate carbonate units wherein u is 0; from 10 to 40 mole percent of arylate carbonate units wherein $R_f$ is methyl and u is one; and from 20 to 40 mole percent mole percent of the carbonate units of the formula

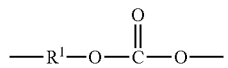

wherein $R^1$ is derived from a bisphenol of the formula

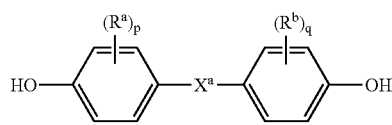

wherein $R^a$ and $R^b$ are each independently a halogen or a $C_{1-12}$ alkyl, $X^a$ is a $C_{1-18}$ alkylene, a $C_{1-18}$ alkylidene, a $C_{3-18}$ cycloalkylidene, or a $C_{9-18}$ fused cycloalkylidene-aromatic group, and p and q are each independently 0 to 4.

6. The composition of claim 5, wherein $X^a$ is isopropylidene and p and q is each zero.

7. The composition of claim 1, wherein T is a residue derived from a cycloaliphatic dicarboxylic acid, and wherein the blend has an improved Notched Izod impact value, measured in accordance with ISO-180 at 23° C., as compared to a Notched Izod impact value of the polycarbonate or the polyester alone.

8. The composition of claim 5, comprising 20 to 60 weight percent of the polyester, wherein T is a residue derived from a cycloaliphatic dicarboxylic acid, and wherein the blend retains at least 50% of its Notched Izod value, measured in accordance with ISO-180 at 23° C., after heat aging at 90° C. for 15 hours.

9. The composition of claim 5, comprising 35 to 45 weight percent of the polyester, wherein T is a residue derived from a cycloaliphatic dicarboxylic acid, and wherein the blend retains at least 50% of its Notched Izod value, measured in accordance with ISO-180 at 23° C., after heat aging at 90° C. for 15 hours.

10. The composition of claim 1, wherein T is a residue derived from an aromatic dicarboxylic acid, optionally in combination with a different aliphatic or aromatic dicarboxylic acid or equivalent thereof, and D further comprises a residue derived from a $C_{2-4}$ diol, and wherein the blend has an improved Notched Izod impact value compared to the Notched Izod value of the polycarbonate and the polyester alone, each measured in accordance with ISO-180 at 23° C.

11. The composition of claim 5, comprising 15 to 35 weight percent of the polyester, wherein T is a residue derived from an aromatic dicarboxylic acid, optionally in combination with a different aliphatic or aromatic dicarboxylic acid or equivalent thereof, and D further comprises a residue derived from a $C_{2-4}$ diol, and wherein the blend retains at least 50% of its Notched Izod value, measured in accordance with ISO-180 at 23° C., after heat aging at 90° C. for 15 hours.

12. The composition of claim 1, wherein T is a residue derived from an aromatic dicarboxylic acid, and wherein the blend has an improved Notched Izod value as compared to the Notched Izod value of the polycarbonate and the polyester alone, each measured in accordance with ISO-180 at 23° C.

13. The composition of claim 5, comprising 15 to 50 weight percent of the polyester, wherein T is a residue derived from an aromatic dicarboxylic acid, and wherein the blend retains at least 50% of its Notched Izod value, measured in accordance with ISO-180 at 23° C., after heat aging at 90° C. for 15 hours.

14. The composition of claim 5, wherein T is a residue derived from an aromatic dicarboxylic acid or equivalent thereof, and wherein the blend has a Notched Izod impact value of 20 or greater, measured in accordance with ISO 180 at 0° C.

15. The composition of claim 1, wherein T is derived from cyclohexane dicarboxylic acid and D is derived from 1,4-cyclohexanedimethanol.

16. The composition of claim 1, wherein T is derived from a mixture of terephthalic acid and isophthalic acid and D is derived from 1,4-cyclohexanedimethanol.

17. The composition of claim 1, wherein T is derived from a mixture of terephthalic acid and isophthalic acid and D further comprises up to 50 mole percent of a residue derived a $C_{2-4}$ diol.

18. The composition of claim 1, wherein u is zero.

19. The composition of claim 1, wherein u is 1 and $R_f$ is a methyl.

20. The composition of claim 1, comprising arylate units wherein u is 1 and $R_f$ is a methyl, and arylate units wherein u is zero.

21. The composition of claim 1, wherein the arylate unit linkages are para to one another.

22. The composition of claim 1, wherein the arylate carbonate units are derived from 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, catechol, hydroquinone; 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,5-di-t-butylhydroquinone, 2,3,5-trimethylhydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or a combination comprising at least one of the foregoing compounds.

23. The composition of claim 1, further comprising an antioxidant, a thermal stabilizer, a light stabilizers, an ultraviolet light absorbing additive, a quencher, a plasticizer, a lubricant, a mold release agent, an antistatic agents, a dye, a pigment, a filler, a light effect additive, a flame retardant, an anti-drip agent, a radiation stabilizer, or a combination comprising at least one of the foregoing additives.

24. The composition of claim 1, further comprising of 2 to 30 weight percent of an impact modifier, based on the total weight of the composition.

25. The composition of claim 24, wherein the impact modifier is a natural rubber, a low-density polyethylene, a high-density polyethylene, a polypropylene, a polystyrene, a polybutadiene, a styrene-butadiene copolymer, a styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), a styrene-acrylonitrile (SAN), an ethylene-propylene copolymer, an ethylene-propylene-diene terpolymer, an ethylene-methyl acrylate copolymer, an ethylene-ethyl acrylate copolymer, an ethylene-vinyl acetate copolymer, an ethylene-glycidyl methacrylate copolymer, a polyethylene terephthalate-poly(tetramethyleneoxide)glycol block copolymer, a polyethylene terephthalate/isophthalate-poly(tetramethyleneoxide)glycol block copolymer, a silicone rubber, or a combination comprising at least one of the foregoing impact modifiers.

26. An article comprising the composition of claim 1.

27. The article of claim 26, wherein the article is an extruded or injection molded article.

28. The article of claim 26, in the form of a component of a household appliance.

29. A method of forming an article, comprising shaping, extruding, blow molding, or injection molding the composition of claim 1 to form the article.

30. A method of forming a composition, comprising blending the components of the composition of claim 1.

31. A composition comprising a blend of:
from 20 to 80 weight percent of a polycarbonate consisting of
from 20 to 80 mole percent of one or more arylate carbonate units of the formula

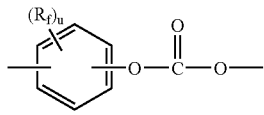

wherein each $R_f$ is independently methyl, and u is 0 to 2; and
from 20 to 80 mole percent of different carbonate units of the formula

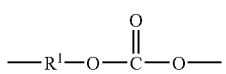

wherein $R^1$ is derived from bisphenol A; and
from 20 to 80 weight percent of poly(1,4-cyclohexanedimethanol-1,4-dicarboxylate), poly(cyclohexanedimethylene terephthalate)-co-poly(ethylene terephthalate) wherein greater than 50 mol % of the ester groups are derived from 1,4-cyclohexanedimethanol, or poly(cyclohexanedimethanol terephthalate); wherein
the weight percent of the polycarbonate and the polyester are each based on the total weight of the polycarbonate and the polyester; and wherein
the blend has an improved Notched Izod impact value compared to the Notched Izod value of the polycarbonate and the polyester alone, each measured in accordance with ISO-180 at 23° C.

32. A composition comprising a blend of:
from 20 to 80 weight percent of a polycarbonate consisting of
from 20 to 40 mole percent of one or more arylate carbonate units of the formula

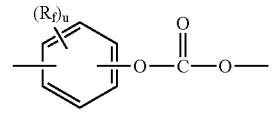

wherein $R_f$ is methyl and u is 1,
from 20 to 40 mole percent of arylate carbonate units of the formula

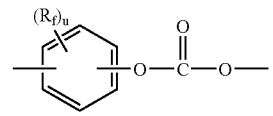

wherein u is 0, and
from 20 to 80 mole percent of different carbonate units of the formula

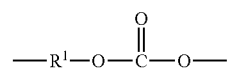

wherein $R^1$ is derived from bisphenol A; and
from 20 to 80 weight percent of poly(1,4-cyclohexanedimethanol-1,4-dicarboxylate), poly(cyclohexanedimethylene terephthalate)-co-poly(ethylene terephthalate) wherein greater than 50 mol % of the ester groups are derived from 1,4-cyclohexanedimethanol, or poly(cyclohexanedimethanol terephthalate; wherein
the weight percent of the polycarbonate and the polyester are each based on the total weight of the polycarbonate and the polyester; and wherein
the blend has an improved Notched Izod impact value compared to the Notched Izod value of the polycarbonate and the polyester alone, each measured in accordance with ISO-180 at 23° C.

* * * * *

UNITED STATES PATENT AND TRADEMARK OFFICE
CERTIFICATE OF CORRECTION

PATENT NO. : 7,655,737 B2 Page 1 of 1
APPLICATION NO. : 11/560642
DATED : February 2, 2010
INVENTOR(S) : Chakravarti et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 693 days.

Signed and Sealed this

Twenty-third Day of November, 2010

David J. Kappos
*Director of the United States Patent and Trademark Office*